Feb. 5, 1935.  J. E. SPECHT  1,989,829
CONTROL SYSTEM
Filed Sept. 21, 1932    2 Sheets—Sheet 2
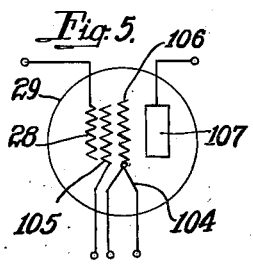
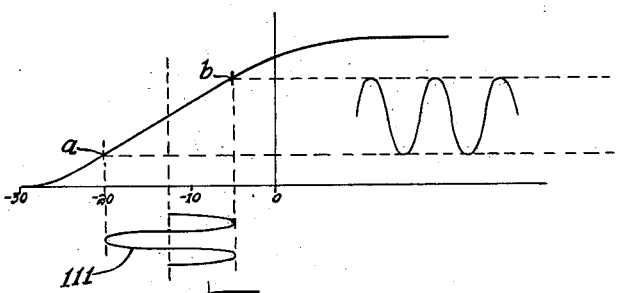
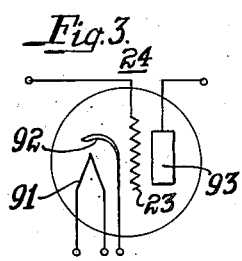
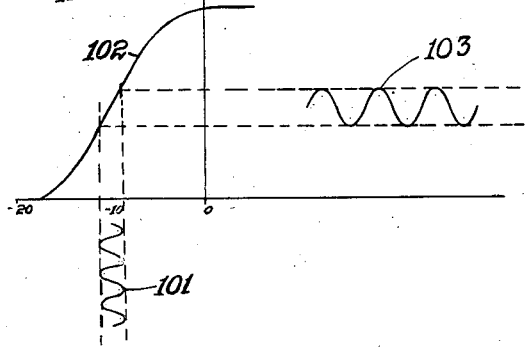
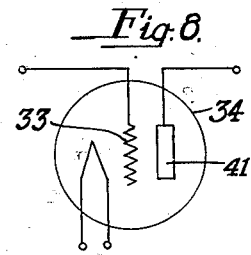
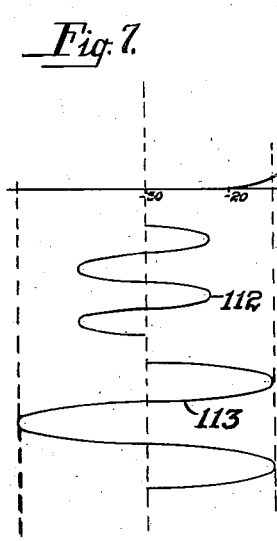
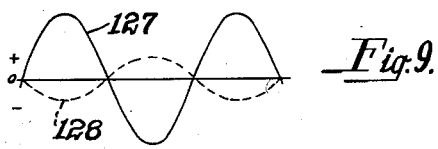
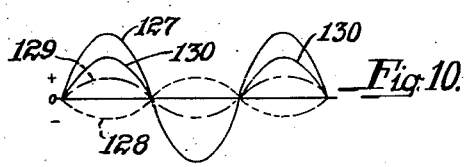
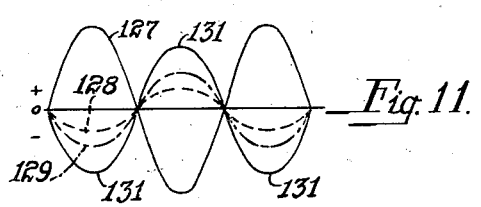
INVENTOR
James E. Specht
BY Green & McCallister
his ATTORNEYS.

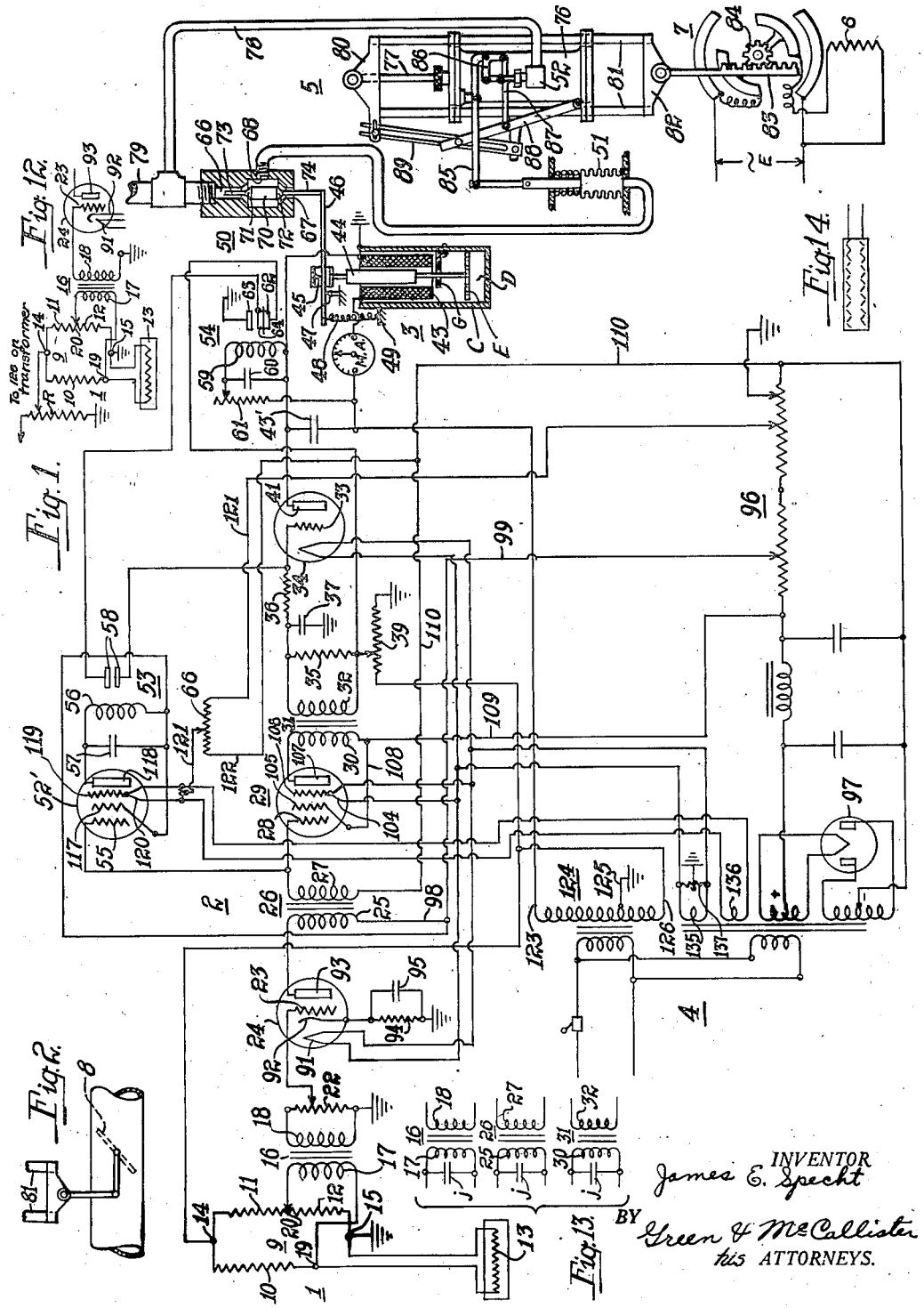

Patented Feb. 5, 1935

1,989,829

UNITED STATES PATENT OFFICE 1,989,829

CONTROL SYSTEM

James E. Specht, Orrville, Ohio, assignor to John M. Hopwood, Dormont, Pa.

Application September 21, 1932, Serial No. 634,192

12 Claims. (Cl. 236—78)

This invention relates to control systems and it has for an object the provision of a system that shall be sensitive to changes in a condition to be controlled, simple in construction, efficient in operation and adapted to give infinitesimal adjustments to an operative upon which the condition depends.

Another object of the invention is the provision of a control system whereby an operative such as the source heat for a furnace or other device may be so regulated or adjusted by infinitesimal steps, in accordance with changes in a condition or temperature, as affected by said operative or source of heat, that there shall be substantially no time lag between the change in the condition or temperature or some other variable and the adjustment of the source of heat or other operative.

A further object of the invention is the provision of a control system that shall be adapted to respond to minute changes in a variable to be controlled and to translate or convert said changes into powerful actuating forces, the magnitude and direction of which may be controlled with precision over a wide range.

Other objects of the invention will, in part, be apparent and will, in part, be obvious from the following description taken in conjunction with the accompanying drawings in which:

Figure 1 is a diagrammatic view of a control system arranged and constructed in accordance with an embodiment of the invention. In this view the system is shown in conjunction with a voltage regulator for controlling the power input to the resistor of an electric furnace in accordance with the temperature thereof;

Fig. 2 is a fragmentary view of a conduit having a damper or valve therein which may be controlled by the system shown in Fig. 1;

Fig. 3 is a view of an amplifying tube employed in the first stage of the circuit shown in Fig. 1, and in Fig. 4 the characteristic of the tube of Fig. 3 is illustrated graphically;

Fig. 5 is a diagrammatic view of an amplifying tube employed in the second stage of the circuit of Fig. 1, the operating characteristics of which tube are graphically illustrated in Fig. 6;

Fig. 7 represents graphically the operating characteristics of a tube, such as shown in Fig. 5, when used as a detector in the circuit of Fig. 1;

Fig. 8 is a diagrammatic view of the tube employed in the output stage of the circuit of Fig. 1;

Figs. 9, 10 and 11 show the relation existing between the plate potential, the fixed grid bias, the amplified grid bias signal and the plate current in the tube of Fig. 8, which result in response to normal, sub-normal and abnormal temperatures, respectively, to which a temperature responsive element embodied in the system of Fig. 1 is subjected.

Fig. 12 is a diagrammatic view showing a modified circuit arrangement adapted to be utilized in the circuit of Fig. 1;

Fig. 13 is a diagrammatic view showing the application of condensers to the primary windings of the stage transformers included in the circuit of Fig. 1; and Fig. 14 is a view of a temperature responsive element adapted for use in the Wheatstone bridge of Fig. 1.

Throughout the drawings and the specification, like reference characters indicate like parts.

In Fig. 1 of the drawings, a control system is illustrated that comprises, in general, means 1, adapted to respond to a condition or variable to be controlled and to develop variable alternating current voltage in accordance with variations in said condition, an audio frequency amplifying unit 2, an actuating device 3, and a power pack or unit 4 which provides the electromotive forces and the source of current for operating the amplifying unit.

The actuating device 3 may be utilized to govern the operation of the motor device 5 disposed to regulate a medium or operative upon which the condition to be maintained depends.

The control system illustrated may be adapted to numerous practical applications, as will be apparent to those skilled in the art. One of such applications may, for example, be the regulation of furnace temperature. The system may be applied to electric furnaces or to fuel fired furnaces.

In Fig. 1 the system is shown as applied to a furnace (not shown) which is heated by an electric resistor 6. As shown in Fig. 1, a voltage regulator 7 is disposed for operation by motor device 5 so that the voltage impressed on the resistor may be increased or decreased in accordance with the demand for heat or the temperature to be maintained in the furnace.

The system may be utilized also to control fuel fired furnaces, in which the temperature or the demand for heat may be regulated by controlling stoker motors, fuel valves, dampers, etc. (not shown).

In Fig. 2 a fuel valve 8 is illustrated which may be operated by motor device 5 in accordance with operating conditions.

Means 1 responds to temperature changes in the furnace and is adapted to develop alternating current voltage, the magnitude and polarity of which are proportional to and in accordance with such changes in temperature. The voltage so developed is impressed on the amplifying unit whereby variations in the magnitude of the current flowing in the output stage of the amplifying unit and corresponding variations in the energization and operation of actuating device 3 are attained.

Actuating device 3 controls the operation of motor device 5 which in turn effects adjustment in the voltage regulator, and hence the voltage impressed on the furnace resistor. Thus, as the temperature in the furnace rises or falls, means 1 develops a voltage in accordance therewith whereby the energization of actuating device 3 is so varied that the operation of motor device 5, and the consequent regulation of the power input to the furnace resistor will be such as to maintain the furnace temperature substantially constant at a predetermined value.

Means 1, as illustrated, may comprise a Wheatstone bridge 9 having resistance elements 10, 11, and 12, each of which has a low temperature coefficient of resistance, and a temperature responsive resistance element 13 which has a high but substantially constant temperature coefficient of resistance. The temperature responsive element 13 is subjected to the furnace temperature so that its resistance will vary with changes in said temperature.

The temperature coefficient of resistance of element 13 may either be positive or negative, the "Nernst glower" being an example of the latter. The Nernst glower is a resistance element composed chiefly of metal oxides, such as the oxides of thorium, cerium, zirconium and/or other elements of this group.

The Nernst glower type resistance element has a very high negative coefficient of resistance and the coefficient is substantially constant over a wide range of temperature. Thus, the change in resistance of this element will be substantially a linear function of the temperature.

The Wheatstone bridge may be energized with alternating current voltage of commercial frequency which is impressed on the bridge at points 14 and 15. In order that changes in resistance of element 13 may be utilized to develop alternating current voltage for producing variations in the current output of the amplifying unit 2 in accordance with variations in temperature, a transformer 16 having a primary winding 17 and a secondary winding 18 is provided. The primary winding is connected across the galvanometer points of the bridge as indicated at 19 and 20.

In operation, the bridge is adjusted to give zero potential across the galvanometer points when the temperature of element 13 is at the value desired in the furnace. Therefore, at balanced bridge conditions, the voltage impressed on the primary transformer winding 17 will be zero. However, if the temperature of resistor element 13 changes, an alternating current voltage will be impressed on primary winding 17, the magnitude of which will depend upon the change in resistance of element 13 and the amount by which such change in resistance unbalances the bridge. If the temperature is rising from the point at which the bridge is balanced, it will be apparent that the voltage impressed on the primary winding 17 may be in phase with the voltage of the source; or, if the temperature is falling below that which gives balanced bridge conditions, the voltage impressed on the primary winding may be 180° out of phase with the voltage of the source.

If the temperature of resistance element 13 changes from that temperature which gives balanced bridge conditions, a relatively low alternating current voltage will be impressed on the primary winding of the transformer and this voltage will vary practically linearly with the temperature changes in element 13, either above or below the point of balance. The alternating current voltage impressed on transformer 16 induces a voltage in the secondary winding across which a potentiometer 22 is connected, one side of the potentiometer being grounded. A portion of the voltage drop across the potentiometer is utilized for energizing the control grid 23 of an amplifier tube 24 which forms the first stage of the amplifying unit. As the voltage on the grid 23 varies, the plate current passed by the tube varies thereby varying the magnetizing current traversing the primary winding 25 of a transformer 26. The variations in plate current traversing winding 25 induces a voltage in the secondary winding 27 of transformer 26, which is connected to the control grid 28 of a power pentode tube 29. As the voltage impressed on grid 28 varies, corresponding variations are produced in the plate circuit of tube 29, thereby varying the magnetizing current traversing the primary winding 30 of a transformer 31.

As the magnetizing current traversing the primary windings of transformer 31 varies, voltage is induced in the secondary winding 32 thereof. This induced voltage is utilized to energize the grid 33 of a power tube 34 forming the output stage of the unit, and will be referred to herein as the amplified grid bias voltage.

A high resistance load 35 is connected across the secondary winding 32. One end of this resistor is connected in series with a resistor 36 to the grid 33, and a condenser 37 is connected between the high resistance load and resistor 36 to ground so that any high frequency voltages arising in the circuit up to this point are by-passed to ground. This condenser, however, provides a very high impedance to the amplified voltage impressed on the interstage transformer 31 which is of the same frequency as the supply voltage impressed on the Wheatstone bridge.

In the system herein disclosed, it is preferred to operate tube 34 under a fixed grid bias of such value that the plate current will be at zero value when the Wheatstone bridge 9 is balanced and no voltage is impressed on the primary winding of transformer 16. It is also preferred to connect the fixed grid bias voltage in series with the amplified grid bias voltage, which appears across the high resistance load 35.

The fixed grid bias is obtained from a potentiometer 39 which is connected to an alternating current voltage winding embodied in the power pack or unit 4. The plate 41 of tube 34 is connected through a coil 43 of actuating means 3 and a milliameter M. A., to an alternating current winding in the power pack, the voltage of which is 180° (electrical degrees) out of phase with the voltage impressed on the potentiometer 39. Therefore, by adjusting the potentiometer, the fixed grid bias may be adjusted to that value which gives zero plate current in tube 34 when the Wheatstone bridge is balanced.

Since the amplified grid bias voltage and the fixed grid bias voltage are in series with respect to the grid of tube 34, it is apparent that if the temperature of element 13 changes in one direction, the amplified grid bias and the fixed grid bias of tube 34 will be in phase with each other, and out of phase with the plate voltage; and that, when the temperature change is in the opposite direction, the amplified grid bias voltage will be out of phase with the fixed grid bias voltage and thereby reduce the net or effective bias on tube 34. If the amplified grid bias actually exceeds the fixed grid bias, when out of phase therewith, it will be apparent that the net or effective bias on the grid of tube 34 will be in phase with the voltage impressed on plate 41 thereof.

From the above it will be apparent that the highly amplified voltage applied across the resistance load 35 will be either in phase or 180° (electrical degrees) out of phase with the fixed alternating current bias provided by potentiometer 39 depending upon whether the temperature to which the resistance element 13 is subjected is rising above or falling below the temperature at which the Wheatstone bridge is balanced. Therefore, the total negative bias on the power tube 34 will either be greater or less than the original fixed bias voltage is determined by potentiometer 39.

Since the power tube is biased to zero current for normal temperature conditions, any temperature change in one direction from normal which serves to increase the negative bias will not cause any plate current change in the power tube 34. However, a temperature change in the other direction from normal will result in an effective decrease in the total negative bias so that power tube 34 will pass a pulsating direct current that reaches a maximum value when the effective grid bias is reduced to zero. The effective grid bias is reduced to zero as the temperature of resistance element 13 decreases below the normal or desired temperature for which the bridge is balanced.

The plate current which is passed by power tube 34 is utilized to energize coil winding 43 forming part of the actuating device 3. This energizing current is smoothened out by means of a condenser 43' connected in parallel to the coil winding. Device 3 is provided with a movable core 44 disposed within the coil. The core, as shown, is suspended on a knife edge 45 from a lever 46 which is fulcrumed on a knife edge 47. Downward movement of the core is opposed by a spring 48 which is attached to one end of the lever and to a fixed support 49.

The coil and core may be disposed within a housing or case C which provides a space D at its bottom in which a disc E, suspended from a stem attached to the core operates. The stem passes through an aperture formed in a guide G, secured to the case, which serves to hold the lower end of the core in a central position relative to the coil 43.

Disc E and the chamber in the lower end of the case C form in effect a dash pot which tends to prevent surges in the movement of the core 44. Disc E may be perforated as indicated by broken lines.

In practice it has been found that the confined air in case C offers sufficient resistance to movement of the disc to provide the necessary dash pot effect. If increased or greater resistance is required in a given case, oil or other fluid may be used in place of air.

As shown in Fig. 1, case C is grounded so that the inductance and capacitance thereof may not interfere with the circuit constants of the output stage of the amplifier unit. Thus as the current in coil winding 43 varies, the core will move up or down in accordance with the magnitude of the current traversing the coil.

Such movements of the core may be utilized to actuate a pressure regulating valve 50 which controls the operation of motor device 5. The movements of the core may be utilized, also, to control the operation of a rheostat and contact members (not shown) in an electric motor circuit, or any other device the operation of which it is desired to control in accordance with the temperature changes in resistance element 13.

In accordance with the system herein shown, it is proposed to so connect the amplifying circuit that tube 34 will pass current and energize the coil winding of device 3 when the temperature of resistance element 13 is falling or decreasing from the temperature which gives balanced conditions in bridge 9, and when the temperature is rising above the value, at which the bridge is balanced, the tube will be biased for zero plate current. Thus, the coil winding of device 3 will be energized when the temperature of resistance element 13 is below normal, and deenergized when the temperature is above normal.

If the system is operated in accordance with the above scheme, it follows that motor device 5 must turn the voltage regulator towards voltage "increase" position on falling temperature and to voltage "decrease" position on rising temperature. With the type of motor devices herein shown, motor 5 operates the voltage regulator to voltage increase position when valve 50 is being open to transmit increasing pressures to a bellows 51 that operates a pilot valve 52 controlling the direction of motion of the motor device 5. When the temperature is above normal, the valve 50 reduces the pressure in the bellows so that the motor reverses its direction of motion and turns the regulator to voltage decrease position. Motor device 5 and valve 50 will be discussed more in detail hereinafter since there are other features concerning the amplifying unit that require discussion at this point.

In the operation of an amplifier tube, it is well known that the plate current is a linear function of the grid bias between definite limits. In other words, if the negative bias is gradually decreased, the plate current will increase in linear relation to the decrease in bias, until a certain point is reached, beyond which distortion takes place. If the negative bias is decreased beyond this point, the plate current ceases to be a linear function of the grid bias. Distortion results also if the negative bias is increased beyond a predetermined point. Between these points the plate current curve is straight and is a linear function of the grid bias.

In view of such known characteristics inherent in amplifier tubes, it follows that if accurate control of motor device 5 is to be had, the output current of tube 34 utilized for control purposes, should be confined to that portion of its plate current characteristic which is a linear function of the negative grid bias.

In order that only the undistorted output range of tube 34 may be utilized, it is proposed to remove all bias from the grid of this tube when the temperature of element 13 has decreased a predetermined amount, say 100°, below normal, and to remove only the amplified grid bias, when the temperature has increased a predetermined amount above normal, say 100°. When the amplified grid bias is removed, tube 34 is biased to zero plate current because the fixed bias of potentiometer 39 is impressed on the grid thereof, and is adjusted for zero plate current.

In order that the plate current of power tube 34 may be maintained at its maximum value when the temperature of resistance element 13 has decreased to a predetermined value below the normal temperature, and so that said tube 34 may be biased to zero plate current when the temperature of resistance element 13 has increased to a predetermined value above normal temperature, a detector tube 52', a relay 53 controlled by the detector tube, and a relay 54 which is responsive to the output current of power tube 34, are provided.

The detector tube herein employed may be of the same type as pentode tube 29, except that it is biased normally for zero plate current. Thus, this tube functions as a detector rather than as an amplifier. The grid 55 of the detector tube 52' is connected to the secondary winding of transformer 26 so that the control grids of tubes 29 and 52 are at the same amplified grid potential, and are therefore both influenced by changes in temperature of resistor element 13.

Relay 53 which is controlled by the detector tube comprises a coil winding 56 connected in series with the plate circuit of the detector tube and in parallel with a condenser 57, and a pair of normally open contact members 58.

Relay 54 comprises a coil winding 59 having a condenser 60 connected across the terminals thereof, the coil winding being connected in parallel with the coil winding of actuating device 3. An adjustable resistor 61 is connected in series with the coil winding of relay 54 so that the point at which the relay operates may be adjusted.

Relay 54 includes two stationary contact members 62 and 63 and a movable contact member 64 which normally engages contact member 62 when the current flowing in the plate circuit of power tube 34 is below a predetermined value. When the current exceeds this value, contact member 64 is actuated to engage stationary contact member 63. Contact member 63 is connected to ground and the movable contact member is connected to one of the contact members 58 of relays 53. The other of the contact members 58 is connected to the grid of tube 34. Stationary contact member 62 of relay 54 is connected to the junction between the load resistance 35 and grid bias potentiometer 39.

When the system has been adjusted and the normal temperature changes above and below normal have been determined, the resistor 61 is so adjusted that relay 54 will close contact members 63 and 64 when the temperature has decreased to, say 80% of the permissible gradient below normal. These contact members will remain closed so long as the temperature has decreased to or below this value.

The bias of detector tube 52' is adjusted by means of a potentiometer 66, so that relay 53 will close its contact members 58 when the temperature has decreased to say 100% of the temperature gradient below normal and when it has increased to say 100% above normal.

Thus, if the temperature decreases to 80% of the gradient below normal, contact members 63 and 64 close and when the temperature falls to 100% of this gradient, contact members 58 of relay 53 are closed. When these contact members are closed, it will be apparent that the grid potential of tube 34 is reduced to ground potential thereby removing both the amplified grid bias and the fixed bias furnished by potentiometer 39.

When the temperature has decreased, as set forth above, and relays 53 and 54 have closed, means 3 will have caused motor 5 to shift the voltage regulator 7 (or fuel valve 8), as the case may be, to maximum voltage position, (or valve 8 to wide open position). Therefore, since tube 34 is biased to maximum plate current under the conditions above described, motor device 5 will hold the voltage regulator in its maximum voltage position. If the motor were utilized to operate a damper or fuel valve, such as shown in Fig. 2 the valve or damper would be held in its wide open position.

As soon as the temperature increases to a point equal to or slightly less than 100% of the gradient below normal, relay 53 opens whereby the grid of tube 34 is again affected by the amplified and fixed bias potentials so that, as the temperature gradually approaches normal value, the plate current in tube 34 is gradually decreased. As the temperature passes through the 80% point below normal, contact members 63 and 64 open and contact members 64 and 62 close. These contact members remain closed so long as the temperature is above this point.

When the temperature is above normal, tube 34 is biased to zero plate current so that the voltage on the furnace resistor 6 is reduced to a minimum, or in some cases may even be reduced to zero. However, if the temperature continues to rise, the negative bias will continue to increase until the temperature reaches a value equal to say 100% of gradient above normal. When this point is reached, relay 53 again closes so that a circuit is completed through contact members 64 and 62 of relay 54 which places the grid of tube 34 and the point of connection of the resistance load 35 to potentiometer 39, at the same potential, thereby removing the amplified grid bias, so that the grid of tube 34 is affected only by the fixed grid bias furnished by potentiometer 39. The tube is, therefore, biased to zero plate current which condition will remain until the temperature has decreased to a value below normal.

As soon as the temperature is below normal, tube 34 will again pass current in proportion to the temperature of resistance element 13 and the voltage regulator will be adjusted accordingly.

Pressure reducing valve 50 illustrated herein, may comprise a valve body having inlet and exhaust ports 66 and 67, at the opposite ends thereof, and a discharge port 68 through which a medium, such as compressed air may flow to or from the interior of bellows 51 which controls the operation of pilot valve 52. A valve member 70 having conical surfaces 71 and 72 at its opposite ends is disposed within the body and adapted to so regulate the inlet and exhaust ports that the pressure within the valve body, and hence the pressure in the bellows, may be varied from a value equal to the maximum pressure of the source to atmospheric.

The valve member is provided with extended guide members 73 and 74 that extend into the inlet and exhaust ports. The extended portion in the exhaust port engages one end of lever 46 of actuating device 3.

When the solenoid winding of device 3 is fully energized, that is when tube 34 is passing maximum current, lever 46 is shifted to that position in which valve member 70 completely closes the exhaust port and opens wide the inlet port. Under these conditions, the bellows 51 is under maximum pressure so that the pilot valve will move to that position which causes motor device 5 to shift the induction regulator (or the damper of Fig. 2) to maximum voltage position or the damper to its maximum open position.

When the solenoid winding of device 3 is de-energized, that is, when tube 34 is biased to zero plate current, the inlet port of the valve is completely closed and the exhaust port is wide open. Therefore, under these conditions, the pressure within the valve body, and the bellows 51 is reduced to atmospheric. For any intermediate position of valve member 70, the pressure in the valve body and the bellows will be proportional to the difference between the pressure drop through the inlet port and the pressure drop through the exhaust port.

Since the solenoid winding of device 3 may be variably energized from zero to a maximum, or vice versa, by infinitesimal steps, it follows that the pressure within the valve body and bellows 51 may be varied from a minimum to a maximum value, or vice versa, by infinitesimal increments.

As the current changes in the solenoid winding of device 3 are proportional to the changes in temperature of resistance element 13, it follows that the adjustments in the voltage regulator, or the damper or valve, as the case may be, will also follow these temperature changes. These adjustments instead of being made too great or too small, as in prior art systems, are made to follow the actual rate at which the temperature changes take place. In other words, if the rate of temperature change is low, the adjustments in the source of heat will be made at low rate, or if the temperature change is at a higher rate, the adjustments in the source will be made at a higher rate.

Furthermore, if the rate of temperature change is constant and continuous over the permissible gradient above or below normal, the adjustments in the source will also be continuous and at a constant rate.

Motor device 5 may be of the pneumatic type such as disclosed in John M. Hopwood Patent No. 1,371,243, granted March 15, 1921. Such a device comprises a cylinder 76 having a double acting piston therein (not shown) to which a piston rod 77 is attached. The pilot valve 52 is adapted to admit a medium under pressure, such as compressed air, to the cylinder at one side or the other of the piston in accordance with the pressure existing in bellows 51.

The pressure medium is conveyed to the valve by a pipe 78 which is connected to a supply pipe 79 to which the inlet port of valve 50 is connected.

If the pressure in the bellows is increasing, the operating pressure admitted to the cylinder acts on the lower side of the piston causing it to move upwardly, and downwardly when the pressure in the bellows is decreasing.

The upper end of the piston carries a cross-head 80 from which side rods 81 depend, the lower ends of the rods being connected by a crosshead 82. Crosshead 82 carries a rack bar 83 that meshes with a pinion 84 attached to the shaft of the movable coil windings of the induction regulator, so that the regulator is adjusted to increase or decrease the voltage impressed on the furnace resistor in accordance with the demand for heat.

The pilot valve 52 is operated by bellows 51 through a rocker arm 85 and a bell crank 86 that connects the stem of the valve to the rocker arm.

In order that the piston may move in incremental steps, the bell crank is connected by a link 87 to a pivoted lever 88 which in turn is coupled to an angling bar 89 carried by one of the side rods 81. When the piston moves, in one direction or the other, the angling bar, lever, and link cooperate to turn the bell crank in such a direction as to close the valve each time it is operated by the bellows, so that step-by-step movement of the piston is obtained in either direction. If the pressure change in bellows 51 is continuous, the movement of the piston will practically be continuous also.

The amplifying circuit illustrated herein may take various forms, although the circuit shown is preferred in that it has proved to be satisfactory, accurate and sensitive in practice.

The tube utilized in the first stage is known as Type UY—227, having a heater filament 91, a uni-potential cathode 92 which is heated by radiation from filament, the control grid 23 and a plate 93. The uni-potential cathode is connected to ground through a resistor 94 and condenser 95 connected in parallel so that the tube operates as a self-biased amplifier.

In practice, the plate of tube 24 may be operated at approximately 150 volts derived from a potentiometer 96 connected across the direct current side of a double wave rectifier 97 forming part of the power pack or unit 4. As shown the plate is connected through the primary winding of transformer 26 and conductors 98 and 99 to the 150 volt point of the potentiometer. The fixed bias on this tube is adjusted to about (—10) volts so that the net plate voltage is approximately 140 volts.

In Fig. 4, curve 101 represents the voltage impressed on grid 23 of tube 24, curve 102 represents the plate current characteristic of the tube, and curve 103 represents the output current of the tube which results when the variable voltage, indicated by curve 101, is impressed on the grid by means 1.

Tube 29, the pentode tube, may be of the type known as R. C. A. Type—247 and comprises an ordinary filament 104, the control grid 28, a high voltage screen grid 105, a suppressor grid 106 connected inside the tube to the filament, and plate 107. This tube operates in the same manner as the conventional triode tube, except that the overall amplification ratio is much higher, because of the additional grids 105 and 106. Grids 105 and 106 tend to neutralize the space charge and to increase the amplification ratio.

In operation plate 107 and grid 105 operate at approximately 200 volts obtained from the direct current side of the rectifier 97, being connected thereto by conductors 108 and 109. The control grid 28 of this tube is given a negative bias of approximately 13 volts obtained from potentiometer 96 by a connection including the secondary winding 27 and a conductor 110. The induced voltage in winding 27 gives the control grid bias voltage which is represented by curve 111 of Fig. 6. Because of the manner in which relays 53 and 54 operate only the output current of tube 29 which falls within the limits (a) and (b) of the straight portion of the plate current curve is utilized to effect variations in the amplified grid bias voltage transmitted to the grid of power tube 34.

The curves in Fig. 7 illustrate the points at which the detector control relay 53 operates. So long as the grid bias voltage applied to grid 55 does not exceed the limits of curve 112 beyond certain limits on either side of the fixed bias voltage which may be taken as (—30) volts, relay 53 does not operate. However, when the grid bias voltage exceeds the voltage represented by curve 112 by an amount represented by the difference between the values of curves 112 and 113, detector tube 52' detects plate current as indicated at 114, 115, and 116 which is sufficient to close relay 53.

Curve 112 represents the grid control voltage which results when the temperature change above or below normal is within the permissible gradient; whereas curve 113 represents the grid bias voltage which results when this temperature exceeds the permissible gradient by a predetermined amount in either direction.

Grid 117 and plate 118 of tube 52' operate on approximately 150 volts, in this circuit, and grid 119 connected to the filament 120 is given a bias from potentiometer 66 one side of which is connected by a conductor 121 to potentiometer 96 at about the (+25) volt position, and the other end is connected by conductors 122 and 110 to the negative terminal thereof which is at a potential of say (—13) volts.

The curves illustrated in Figs. 9, 10 and 11 show how the phase relation between the amplified grid bias and the fixed grid bias voltages affect the plate current of tube 34. As may be seen from Fig. 1, the plate of tube 34 is connected through solenoid 43, of means 3, and milliammeter M. A., to terminal 123 of a transformer winding 124 in the power pack which is grounded at 125, and the other terminal 126 is connected to the ungrounded terminal of potentiometer 39. The voltage impressed on the plate of tube 34 may be about 400 volts and that impressed across potentiometer 39 may be about 120 volts. However, as terminals 123 and 126 of winding 124 are of opposite polarity with respect to the ground connection at 125, the voltage impressed on plate 41 is 180° out of phase with the voltage impressed on potentiometer 39 which furnishes the fixed grid bias for grid 33. Thus, as indicated in Fig. 9, the plate potential curve 127 is 180° out of phase with the fixed grid bias potential curve 128, which as stated previously herein results in zero plate current.

If the temperature of resistance element 13 is falling, the amplified grid bias, represented by curve 129 is 180° out of phase with the fixed grid bias curve 128, so that plate current, indicated by curve 130, is passed by the tube.

If the temperature is rising, the amplified grid bias curve 129 is in phase with the fixed bias curve 128 as indicated in Fig. 11, which gives a total negative bias as indicated by curve 131, which is out of phase with the plate potential, so that no plate current is passed.

The filaments of tubes 24, 29 and 34 may be connected in parallel across a low voltage alternating current winding 135 of the power pack, and the filament of detector tube 52' is connected to a low voltage winding 136. Winding 135 has a resistor 137 of relatively low ohmic resistance shunted thereacross, the midpoint of which is grounded so that the filaments may be balanced. A similar resistor is connected across the filament of tube 52' but in this instance the potentiometer 66 is connected to the midpoint thereof so that all parts of filament 120 and the grid 119 may be affected with a uniform negative bias.

The system shown in Fig. 1 may be modified slightly as shown in Fig. 12. With reference to Fig. 12, a potentiometer R is shown across which the Wheatstone bridge may be connected. The potentiometer would be connected across terminals 125 and 126 of transformer 124. By adjusting potentiometer R, the sensitivity of the system may be adjusted. When potentiometer R is used, potentiometer 22, Fig. 1, may be omitted, in which case secondary winding 18 would be connected directly to grid 23. In other respects the system would be the same as in Fig. 1.

The efficiency of tubes 24 and 29 may be considerably increased in commercial frequency amplification, if these tubes are relieved of the duty of supplying the magnetizing currents for the transformers 16, 26, and 31. These magnetizing currents may be supplied almost entirely by suitable condensers J connected across the primary windings 17, 25 and 30, respectively, as shown in Fig. 13.

While the system herein shown has been disclosed in connection with a furnace regulator for controlling the voltage and the power input to the heating resistors of a furnace, it is to be understood that any device may be operated by the system, where such device controls an operative which in turn tends to maintain a condition constant to which the means 1 is adapted to respond. Furthermore, while means 1 has been illustrated as comprising a Wheatstone bridge of the resistance type, it will be apparent to those skilled in the art that the branches of the bridge included in means 1 may be composed of inductances, one or more of which may be variable in accordance with some condition to be controlled to produce the unbalanced conditions necessary for varying the plate current in the output stage of the amplifying unit.

The amplifying unit itself may be modified according to the particular application or service to which it is put.

While only one embodiment of the invention has been shown and described herein, it will be apparent to those skilled in the art that various modifications and changes may be made without departing from either the spirit or the scope of the invention. It is desired therefore that only such limitations shall be placed on the invention as are imposed by the prior art and the appended claims.

What I claim as new and desire to secure by Letters Patent is:

1. In a control system, the combination with an amplifying circuit having at least two stages of amplification each including a grid controlled amplifier tube, of means responsive to a variable for impressing a variable potential on the grid of the first stage tube, thereby providing a variable amplified grid bias for the last stage tube, a source of negative grid bias connected in series with said amplified grid bias, means for removing the amplified grid bias from the last stage tube in response to the amplified bias increasing to a predetermined negative value, and means operating in conjunction with said bias responsive means adapted to remove both the amplified and fixed grid bias from said last mentioned tube in response to the plate current thereof reaching a predetermined value.

2. The combination with an audio-frequency amplifying circuit having at least one stage of amplification including an amplifier tube and a power tube having a grid, filament and plate, a Wheatstone bridge adapted to be connected to a source of alternating current and a transformer connected to the galvanometer points of the bridge and a connection from the transformer to the grid of the amplifier tube, said bridge being adapted to be unbalanced by and in accordance with a condition to be controlled, whereby alternating current voltage of variable magnitude and polarity may be impressed on the grid of the amplifier tube, of a source of alternating current voltage for the plate circuit of the power tube, a source of alternating current voltage connected in series with the output voltage of the amplifier to the grid of said power tube, said plate and grid alternating current voltages being 180° out of phase, and means adapted to automatically regulate the grid bias of said power tube so that said tube is biased to zero plate current when the unbalance of the bridge reaches a predetermined value in one direction and to bias said tube to a predetermined maximum plate current when the unbalance of the bridge reaches a predetermined value in the opposite direction.

3. The combination with a power tube having a grid, filament and plate, an actuating device having a current responsive element in circuit with said plate, and a source of alternating current potential connected to said plate circuit, of means responsive to a condition to be controlled for impressing a variable alternating grid bias voltage of commercial frequency on the grid of said tube, thereby to vary the current intensity in said current responsive means, and regulating apparatus continuously controlled by said current responsive device in accordance with the magnitude of the current traversing the same.

4. The combination with a power tube having a grid, filament and plate, an actuating device having a current responsive element in circuit with said plate and a source of alternating current potential connected to said plate circuit, of means responsive to a condition to be controlled for impressing a variable alternating grid bias voltage of commercial frequency on the grid of said tube, thereby to vary the current intensity in said current responsive means, regulating apparatus continuously controlled by said actuating device in accordance with the magnitude of the current traversing the same, and means adapted to automatically bias said tube to zero plate current when the negative bias increases to a predetermined value and to a predetermined maximum plate current when the negative bias decreases to a minimum value.

5. In a control system, the combination with an amplifier unit, having one or more stages of amplification including a grid controlled amplifier tube in each stage, adapted to amplify the magnitude of variable potentials impressed on the grid of the first stage tube, a power tube having a plate circuit including a current responsive actuating device in circuit therewith, a source of alternating current voltage impressed on the plate circuit of said power tube, a fixed source of alternating current negative bias voltage connected, in series with the amplified voltage of said amplifier unit, to the grid of the power tube, said fixed bias voltage being 180 electrical degrees out of phase with the voltage impressed on the plate thereof and of such negative value as to bias the power tube to zero plate current when the amplified voltage is of a predetermined value, and means adapted to automatically control the grid bias of said power tube so that it operates substantialy between the limits of grid bias voltage which produces plate current that varies as a linear function of the negative grid bias.

6. The combination with a Wheatstone bridge having a source of alternating current connected thereto and a transformer connected to the galvanometer points of the bridge, said bridge having an element adapted to unbalance the bridge in accordance with a variable condition, and thereby vary the magnitude and the phase relation between the voltage impressed on said transformer and the voltage of the source, of a power tube having a current responsive actuating device in a plate circuit thereof, means for amplifying the voltages impressed on the transformer, a source of fixed negative bias voltage, means connecting said amplifier and fixed negative bias voltages in series to the grid of the power tube, means adapted to bias the power tube to zero plate current in response to amplified voltage reaching a predetermined negative value, and to a predetermined maximum plate current when the amplified grid bias voltage reaches a predetermined positive value and plate current reaches a predetermined value.

7. The combination with an amplifying system having a three-electrode discharge device provided with plate and grid circuits, means for supplying electric potential to said circuits, and means responsive to a condition to be controlled for varying the polarity and magnitude of the potential impressed on the grid circuit thereby to vary the magnitude of the current in the plate circuit, of a regulator adapted to move at adjustable speed in either direction, a source of motive power for said regulator, a solenoid in circuit with said plate circuit, and means actuated by said solenoid for controling said source of motive power and causing said regulator to move in either direction in accordance with the magnitude of current changes in said plate circuit.

8. The combination with an amplifying system having a three-electrode discharge device provided with plate and grid circuits, means for supplying electric potential to said circuits, and means responsive to a condition to be controlled for varying the polarity and magnitude of the potential impressed on the grid circuit thereby to vary the magnitude of the current in the plate circuit, of a regulator adapted to move at adjustable speed and stroke in either direction, a source of motive power for said regulator, an electro-responsive device in circuit with said plate circuit, and means actuated by said device for controlling said source of motive power and causing said regulator to move at such speed and stroke as is commensurate with the magnitude of current changes in the plate circuit of the amplifying system.

9. The combination with an amplifying system having a three-electrode discharge device provided with plate and grid circuits, means for supplying electric potential to said circuits and means responsive to a condition to be controlled for varying the polarity and magnitude of the potential impressed on the grid circuit thereby to vary the magnitude of the current in the plate circuit, of a regulator adapted to move with a motion varying in magnitude from incremental step-by-step to a continuous full range movement in either direction, a source of motive power for the regulator, means for controlling the power delivered to said regulator, and an electro-responsive device, energized by and in accordance with the magnitude of the current in said plate circuit, for operating said power controlling means to effect such movement of the regulator as is commensurate with the magnitude of the plate current.

10. The combination with an amplifying system having one or more stages of amplification, each stage including a multi-electrode discharge device provided with plate and grid circuits, and a source of voltage for said circuits, of a source of alternating current voltage of commercial frequency connected to the grid of the input device of the system, means responsive to a condition to be controlled for varying the magnitude of the commercial frequency voltage impressed on said grid, a solenoid, in the output circuit of said amplifying system, having a movable core, a source of fluid under pressure, a control impulse line, and a valve under the control of said core adapted to vary the pressure in the impulse line between a value equal to the pressure in the supply line and a relatively low value by infinitesimal steps in accordance with variations in the voltage impressed on the grid of the input device.

11. The combination with a multi-electrode discharge device having plate and grid circuits, a source of voltage for the plate circuit, a source of commercial frequency alternating current voltage connected to the grid circuit of said device, means for varying the magnitude of such grid voltage, and an amplifier for amplifying said grid voltage having a plate circuit and a solenoid energized by changes in the plate circuit current as affected by variations in the amplified grid voltage, of a pressure supply line, a control impulse line adapted to be connected to a device to be controlled and a valve between said lines operated by the solenoid in accordance with changes in the plate current whereby the pressure in the impulse line is caused to vary in accordance with said plate current changes.

12. The combination with a source of fluid pressure medium, a control impulse line adapted to transmit pressure impulses from the source to apparatus to be actuated thereby, and a valve adapted to vary the pressure in the impulse line between predetermined limits, of an amplifying system having input and output stages each provided with grid and plate circuits, a solenoid in circuit with the plate circuit of the output stage, a movable core yieldably mounted in the solenoid, operatively connected to the valve adapted to shift said valve in accordance with current changes in said output plate circuit, a source of voltage for the grid of the input stage and means for varying said grid voltage in accordance with a condition to be regulated, whereby, as said grid voltage changes are amplified, the current changes in the output plate circuit cause the solenoid to operate said valve in accordance with said changes.

JAMES E. SPECHT.